(No Model.)

H. C. JOHNSON & F. M. McMILLAN.
REFRIGERATING AND DRYING GRAIN, &c.

No. 261,460. Patented July 18, 1882.

Attest.
Sidney P. Hollingsworth
Walter S. Dodge

Inventors.
Henry C. Johnson
Francis M. McMillan,
by Dodge & Son,
Attys.

UNITED STATES PATENT OFFICE.

HENRY C. JOHNSON AND FRANCIS M. McMILLAN, OF WASHINGTON, D. C.

REFRIGERATING AND DRYING GRAIN, &c.

SPECIFICATION forming part of Letters Patent No. 261,460, dated July 18, 1882.

Application filed April 22, 1882. (No model.)

*To all whom it may concern:*

Be it known that we, HENRY C. JOHNSON and FRANCIS M. McMILLAN, of Washington, in the District of Columbia, have invented certain Improvements in Refrigerating and Drying Grain, &c., of which the following is a specification.

This invention relates to a method of abstracting moisture from grain and preventing the grain from heating; and it consists in artificially refrigerating pipes carried through the mass of grain, so that the moisture will be collected and frozen upon the surface of the pipes, thereby at once taking up the moisture and cooling the grain.

It is well known that large quantities of grain are injured and not unfrequently ruined by heating while in transit, or while stored in elevators or bins, the heating being due to a process of fermentation, which is in turn occasioned by moisture and the heat of the atmosphere. This difficulty is especially common in warm and damp climates, and has caused the great bulk of the grain raised in the northern and western sections of the country to be shipped by way of the lakes or by rail, instead of being carried by boats down the Mississippi and other rivers, which afford a more direct water route. The transportation by rail is objectionable, first, because of its greater cost, and, secondly, because of the necessity of breaking bulk and handling and rehandling the grain, which, besides increasing the expense, involves considerable loss and more or less injury to the grain.

It has hitherto been attempted to dry the grain, when found to be particularly moist, by means of artificial heat; but such plan, besides having an injurious effect upon the grain for many purposes, is costly, and is not a continuing one lasting during transportation or storage, as is necessary, since the grain receives moisture from the atmosphere, and especially when carried by water. By this plan, however, the drying or absorbing action is constant and continuing, and the heat of the atmosphere is neutralized by the cold produced by the refrigerating apparatus.

Figure 1:
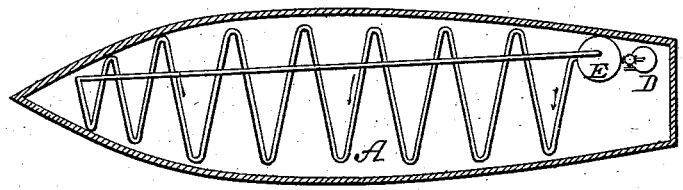
Figure 2:
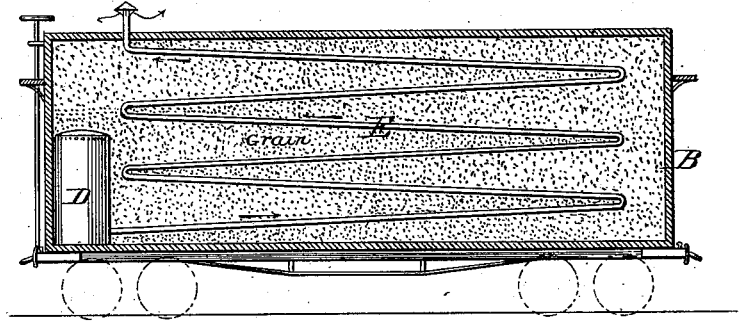

Referring to the accompanying drawings, Figure 1 represents a plan view of a boat adapted to carry out the invention; Fig. 2, a longitudinal vertical section of a car provided with the apparatus for the same purpose; and Fig. 3 represents the manner of applying the invention to grain elevators or carriers.

In carrying out the invention any form of refrigerating apparatus may be employed, though it is preferred to adopt the system set forth in the patent granted to us bearing date May 9, 1882, and numbered 257,506, to which reference is made for any details not found herein, and the drawings accordingly represent such an apparatus. According to said system, gas or other highly-elastic fluid is compressed to liquefaction, and stored in its liquid form in receivers, from which it is permitted to flow in a fine stream to the expansion coil or chamber, where it expands and produces intense cold. The expansion is of course rapid or slow, just in proportion to the facility with which heat passes through the walls of the chamber or coil to restore the quantity taken from the gas in the act of compression. The result of the expansion is that the pipes are rendered exceedingly cold, and the moisture of the surrounding air condenses and is frozen upon the pipes. If, then, the pipes be surrounded by and buried in the grain, and refrigerated, as explained, by the above or other means, the heat necessary to the expansion of the gas will be taken up from the body of grain, and the moisture of the grain or of the air in the mass of grain will be condensed and frozen upon the pipes, and thereby prevented from returning to the grain. The arrangement of the pipes will be varied according to the structure in which they are used.

Referring again to the drawings, A represents a boat, B a car, and C an endless bucket-elevator for transferring grain from one receptacle to another, each adapted to the carrying out of this invention. In each of said figures, D represents the receiver or retort in which is stored the liquefied gas, and E an expansion coil or chamber, which, in the case of the elevator, will communicate with a surrounding space formed by an outer jacket, *a*. The gas is permitted to flow in carefully-regulated quantity from the receiver into the expansion coil or chamber, where it rapidly returns to its gaseous form, taking up the heat of the surrounding atmosphere, and causing the condensation of the moisture thereof, as explained, where brine is not used.

Figure 3:
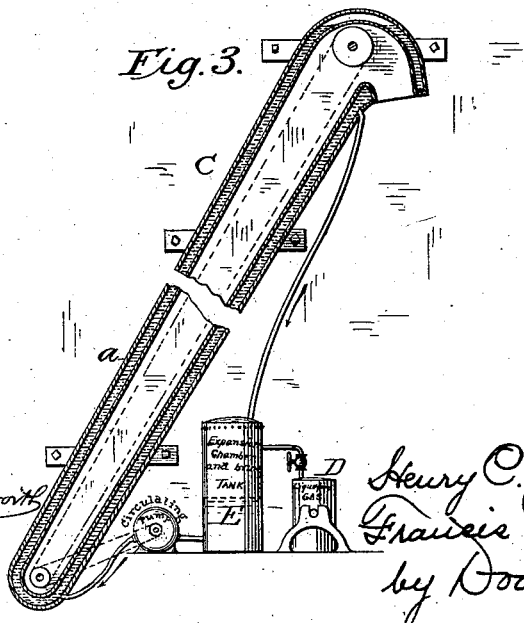

Instead of permitting the gas to flow and expand directly into the expansion coil or chamber, it may be expanded in a tank containing brine or other non-congealable liquid, which will be circulated through the coil or space by suitable means, as explained in the patent referred to, and indicated in Fig. 3.

A number of independent coils or pipes may be employed, if desired, and placed at suitable distances apart to insure the thorough cooling of the entire mass of grain and the absorption of all surplus moisture.

It will be observed that the cars and vessels provided with this apparatus may be used without alteration for the transportation of other matters, whether requiring refrigeration or not, because the refrigeration can be instantly stopped by merely closing the valve through which the gas escapes from the receiver, and therefore grain can be carried in one direction and a miscellaneous cargo in the opposite direction.

It is essential that the pipes be carried through the mass of grain at such short distances apart as will insure the perfect cooling and drying of the grain; but it will be found in practice that the effect will be quite perfect for a considerable distance, owing to the avidity with which heat and moisture are taken up by the expansion of the gas, and the rushing in of a fresh supply to take the place of that absorbed and condensed, which action produces currents of air through the mass.

We do not broadly claim carrying cooling-pipes through the mass to be cooled and deprived of moisture; nor do we specifically claim the method of refrigeration described; but,

Having thus described our invention, what we do claim is—

In combination with a structure adapted to receive grain in bulk, a series of pipes or tubes carried through the structure at short distances apart throughout the same, and a receiver or vessel charged with compressed gas, and communicating directly with the pipes or tubes, as and for the purpose set forth.

HENRY C. JOHNSON.
FRANCIS M. McMILLAN.

Witnesses:
ALBERT MILLER,
JAMES A. BABSON.